United States Patent [19]

Moriki

[11] Patent Number: 4,869,417

[45] Date of Patent: Sep. 26, 1989

[54] AUTOMATIC BUILD-UP WELDING MACHINE FOR TRACK ROLLERS

[75] Inventor: Yasumitsu Moriki, Tokyo, Japan

[73] Assignee: Maruma Jyusharyo Kabushiki Kaisha, Tokyo, Japan

[21] Appl. No.: 262,713

[22] Filed: Oct. 26, 1988

[51] Int. Cl.⁴ .............................................. B23K 9/04
[52] U.S. Cl. ........................................ 228/7; 228/25; 228/27; 219/76.1; 219/76.12; 74/526; 318/467; 318/468
[58] Field of Search ..................... 228/7, 25, 27, 225; 219/76.1, 76.12; 74/526; 318/467, 468

[56] References Cited

U.S. PATENT DOCUMENTS

| | | | |
|---|---|---|---|
| 3,796,937 | 3/1974 | Loffler et al. | 318/468 |
| 3,963,895 | 6/1976 | Hennion | 228/27 |
| 4,223,824 | 9/1980 | Hansen | 228/7 |
| 4,782,206 | 11/1988 | Ayres et al. | 219/76.12 |

FOREIGN PATENT DOCUMENTS

| | | | |
|---|---|---|---|
| 11861 | 1/1979 | Japan | 228/7 |
| 77774 | 5/1983 | Japan | 219/76.1 |
| 1179778 | 1/1970 | United Kingdom | 228/7 |

Primary Examiner—Richard K. Seidel
Assistant Examiner—Samuel M. Heinrich
Attorney, Agent, or Firm—Emmanuel J. Lobato; Robert E. Burns

[57] ABSTRACT

An automatic build-up welding machine for repair of workpieces such as track rollers. The machine requires no operator in charge during the welding operation. The apparatus comprises a device including a pair of guides, and a switch box connected adjustably in position to a welding torch, the switch box housing therein a pair of limit switches for reversing motion of the torch and a swing lever positioned between the limit switches. The apparatus controls the travel of the torch by varying half-cycles of the reciprocable travel thereof.

7 Claims, 2 Drawing Sheets

AUTOMATIC BUILD-UP WELDING MACHINE FOR TRACK ROLLERS

BACKGROUND OF THE INVENTION

1. Field of the Invention

This invention relates to a build-up welding machine used when the surface of a track roller in contact with a belt is worn or the like, which can automatically adjust, in the case where a tapered section of a roller groove is asymmetrical in left and right sides, a welding width according to a welding surface to build-up weld only on the required width.

2. Description of the Prior Art

A typical section of a track roller 1 is as shown in FIG. 1, the angle of inclination of both side walls 3A and 3B of a roller groove 2 is often different.

Since a deposited build-up layer generally comprises a plurality of weld layers, a lateral reciprocation of a welding torch 1 for depositing a build-up layer has to be widened by a distance different upwardly for both ends towards the upper layer.

In the past, a pair of position-adjustable limit switches 6 and 7 are actuated by an actuator 5 operatively associated with lateral motion of the torch by means shown in FIG. 2 in addition to mechanical means such as a cam, a crank and the like, and a position of each of the limit switches is manually varied for every welding layer.

This requires an operator in charge during the welding work, which is uneconomical.

SUMMARY OF THE INVENTION

It is an object of the present invention to provide a fully automatic build-up welding machine which requires no operator in charge during the entire weld-layer deposit step until a required build-up is obtained in the oscillation movement during welding, in which even in the case where the angle of inclination of walls of a roller groove is different and a turn-position of a torch is different in each layer, the torch can be automatically reversed at a proper position to obtain a uniform build-up surface of every layer.

The present apparatus comprises a switch box housing therein a pair of switches which are mounted adjustably in position with respect to a torch which moves in a zigzag fashion over the width of a surface to be built-up, i.e., between inclined walls opposed to a roller. An actuating swing lever is provided between said pair of switches, and a pair of guides is fixedly mounted on the body of a welding machine and set to the angle of inclination of the roller inclined walls and a spacing between walls, whereby the width of motion of the torch is automatically varied according to the width required for welding to effect build-up welding.

In the present invention, the pair of guides can be adjusted in position in left and right directions, respectively, and the adjustment of the angle can be continuously carried out. Since the shape of the roller groove is defined by the makers and according to the kind of machines, the setting of the guides can be simply adjusted by preparing a few gauge plates G as shown in FIG. 6 adjusted to the section of the roller groove.

DETAILED DESCRIPTION OF THE INVENTION

The present apparatus will be described hereinafter with reference to the drawings.

Figure 1:
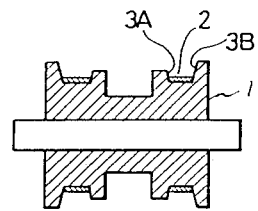
FIG. 1 is a sectional view showing a build-up weld portion in a track roller.
Figure 2:
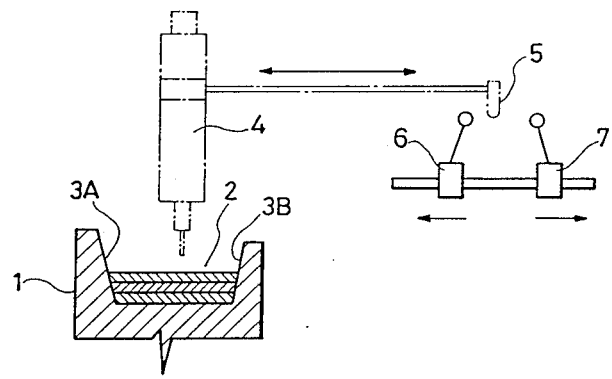
FIG. 2 is an explanatory view of a conventional device.
Figure 3:
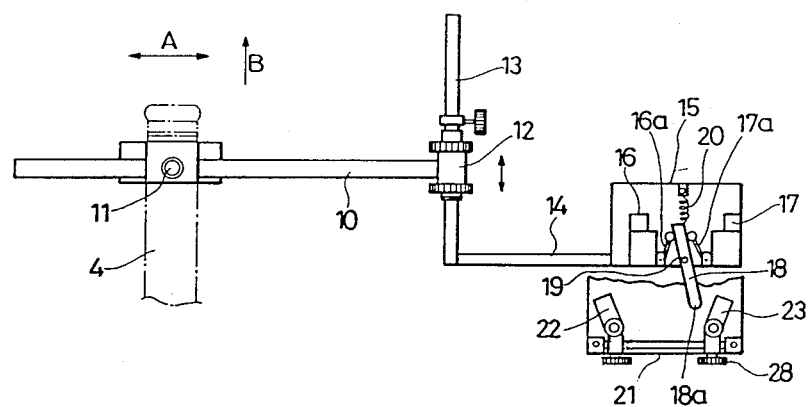
FIG. 3 is a front view of essential parts of apparatus according to the present invention.

A torch 4 reciprocates in a zigzag fashion, as shown in FIG. 3, with respect to the overall width of a surface to be welded. On the other hand, a roller 1, which is a welding object, is step-driven at a required angle and moves around. The torch moves upward (as indicated by the arrow B) through a thickness of a welding layer every completion of each welding layer. The driving devices are similar to those of the prior art and therefore not shown in the drawings.

Reference numeral 10 designates a mounting rod mounted on the torch and can be adjusted in a lateral position by a mounting adjustment screw 11.

Reference numeral 12 designates a height-position fine-adjusting device secured to the end of the mounting rod, and is fitted in a vertical rod 13.

Reference numeral 14 designates a connecting rod secured to the lower end of the vertical rod 13 and supports a switch box 15.

Reference numerals 16 and 17 designate limit switches, which are fixed so that actuators 16a and 17a thereof face each other.

Reference numeral 18 designates a swing lever having a fulcrum 19, and an upper end 18b thereof comes into abutment with the actuator of the limit switch.

Reference numeral 20 designates an element for defining a free movement of the swing lever, and the element can be omitted.

Reference numeral 21 designates a lever collision device provided with a pair of guides 22 and 23 whose vertical angle can be varied.

Reference numerals 24 and 25 designate angle adjusting screws, respectively. The guide 23 is provided on a holder 27 which slidably moves along a rod 26 and a position thereof is defined by a set screw 28.

Reference numerals 29 and 30 designate marks, respectively, for adjusting a height and a position of a start point of the welding.

In the use of the present apparatus, the angles of the guides 22 and 23 of the lever collision device are set while being adjusted to correspond with a respective angle one of the side walls of a build-up surface of a member to be build-up welded, and the spacing therebetween is made to coincidence with the distance between the corresponding side walls of the member being welded.

Figure 4:
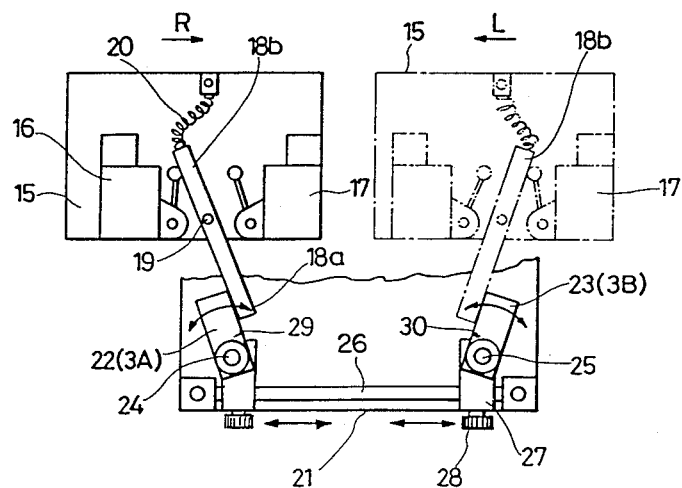
FIG. 4 is a front view showing the relationship between an actuating lever and a collision device.

Next, the tip of the torch is moved to a welding start point on one side, at which position the lever tip portion 18a of the switch box comes into abutment with the corresponding guide to actuate the limit switch. The torch is driven and the reciprocatory welding movement starts. The torch is moved in a direction as indicated by the arrow R in FIG. 4, for example.

When the lower tip 18a of the lever comes into abutment with the guide 23, the upper end 18b of the lever 18 presses the actuator 17a of the switch 17 whereby the driving direction of the torch is reversed to cause the torch to be moved in a direction as indicated by the arrow L.

When the torch is repeatedly moved in a zigzag fashion and the roller 1 is rotated once, the torch 4 and the switch box 17 are moved upward through a welding layer thickness.

Thereby, the point of the lever tip 18a in abutment with the guides 22 and 23, that is, the reciprocating movement distance is extended.

Figure 5:
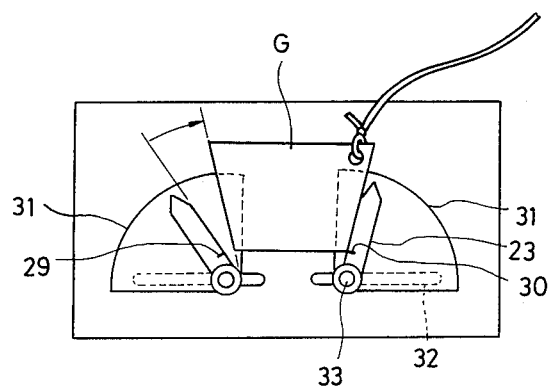
FIG. 5 is a front view of another embodiment of the collision device.
Figure 6:
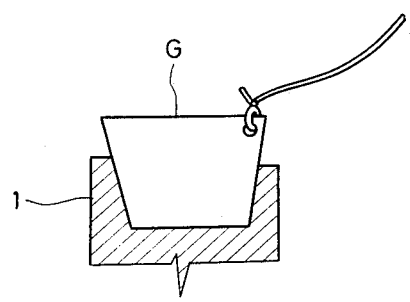
FIG. 6 is a front view showing a gauge plate and a roller grove.

In the present invention, the shape of the actuating lever 18 can be suitably selected. It is noted that in the collision device, an angle graduation plate 31 is mounted on the guides 22 and 23 as shown in FIG. 5, and one of them is fitted into a slide groove 32 to allow an angle adjusting screw 33 to serve for a similar function as the position adjusting screw 28.

According to the present invention, a welded layer having a required thickness is automatically obtained every layer, and therefore, manual operation by an operator in charge is not at all required, and in addition, even if the angle of inclination of both side walls is different in any way, a proper welding width may be obtained for every welded layer, and therefore, a uniform build-up layer can be obtained.

What is claimed is:

1. Apparatus for build-up welding automatically on metallic workpieces a build-up weld layer of multi-layers of weld of varying width comprising a welding torch driven reciprocably for depositing a build-up layer weld on a workpiece, drive means for reciprocably driving the welding torch cyclically, control means for controlling said drive means and automatically varying the distance the welding torch travels in each direction during individual successive reciprocation cycles in correspondence with a desired width of successive weld layers deposited, said control means including means spaced from each other for variably successively determining increments of the distance the welding torch travels in each half-cycle of reciprocation to variably control the width of each weld layer of the multi-layers deposited, means under control of the control means for developing relative increased spacing between a workpiece surface on which welding is effected and the welding torch for providing for thickness increases of the build-up layer weld as the multi-layer weld deposits take place.

2. Apparatus for build-up welding automatically on metallic workpiece a build-up weld layer of multi-layer of weld of varying width according to claim 1, in which said control means comprises reversing means coactive with the drive means for reversing the direction of travel of the welding torch, and said means spaced from each other comprises two spaced guides coactive with the last - mentioned means each having a control surface at an angle inclined relative to the vertical defining the successive increments of increases of travel of the welding torch during each half-cycle of reciprocable travel of the welding torch.

3. Apparatus for build-up welding automatically on metallic workpieces a build-up weld layer of multi-layers of weld of varying width according to claim 2, in which the two guides are adjustable relative to the vertical so that each control surface thereof is inclinable to different angles, thereby varying the width of the multi-layers of weld.

4. Apparatus for build-up welding automatically on metallic workpieces a build-up weld layer of multi-layers of weld of varying width according to claim 1, in which said workpiece is a roller having a circumferential groove having beveled side surfaces, and the build-up weld layer is disposed in said groove between the beveled side surfaces.

5. Apparatus for build-up welding automatically on metallic workpieces a build-up weld layer of multi-layers of weld of varying width according to claim 3, in which said reversing means comprises switches transported reciprocably in conjunction with the welding torch, and a rockable lever for alternately engaging a control surface of the corresponding guides at different contact points of inclination thereof at each half-cycle to thereby successively vary the width of the multi-layer of weld deposited.

6. Apparatus for build-up welding automatically on metallic workpieces a build-up weld of multi-layers of weld of varying width according to claim 1, in which said workpiece has a groove defined by beveled side walls thereof, diverging away from the bottom of the groove, and the build-up weld is deposited on said bottom as successive superimposed layers of weld of increasing width.

7. Apparatus for build-up welding automatically on metallic workpieces a build-up weld of multi-layers of weld of varying width according to claim 6, including a tool having diverging surfaces corresponding with the bevel of the walls of the groove for setting the spacing between the two guides and the inclination thereof.

* * * * *